June 28, 1966 G. MANTOVANELLO 3,258,416
CONNECTOR DEVICE, PARTICULARLY FOR FASTENING CURRENT
CONDUCTORS TO CARBON ELECTRODES
Filed June 26, 1961 3 Sheets-Sheet 2

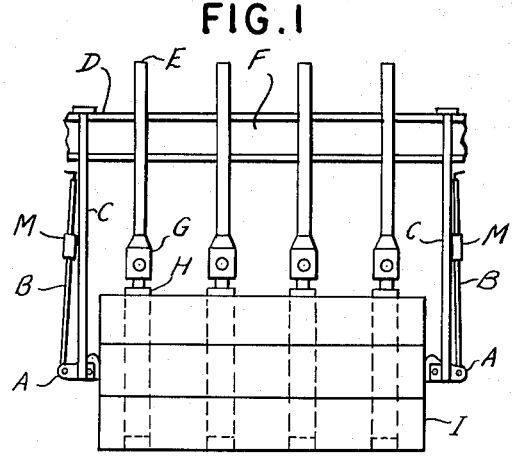
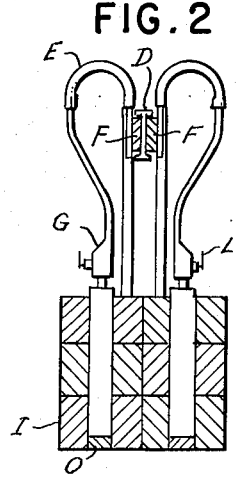
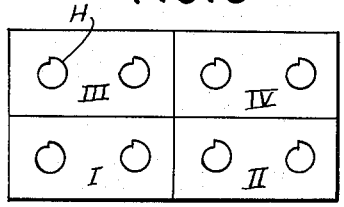
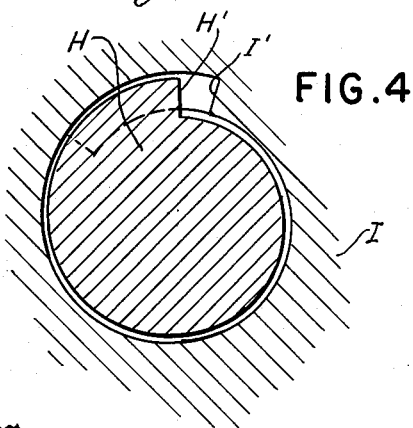
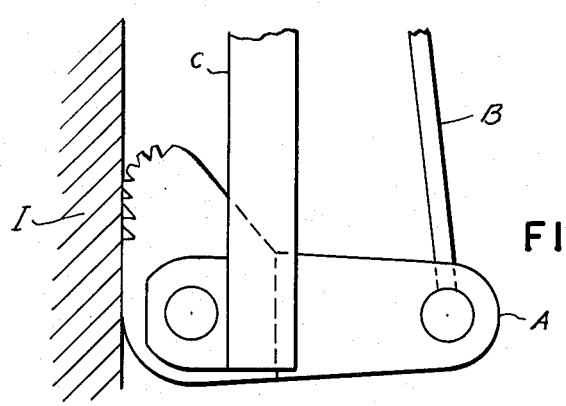

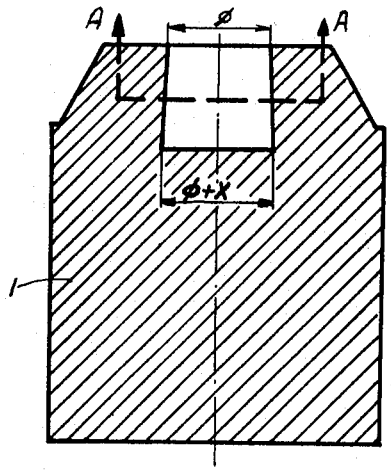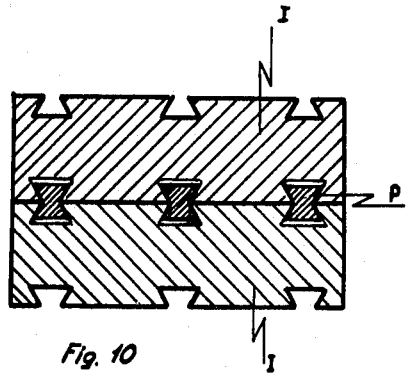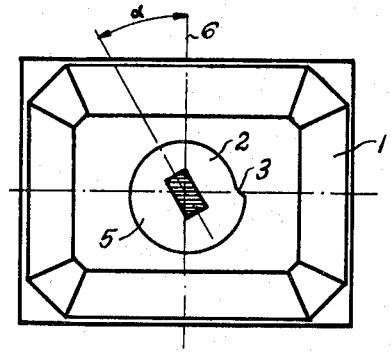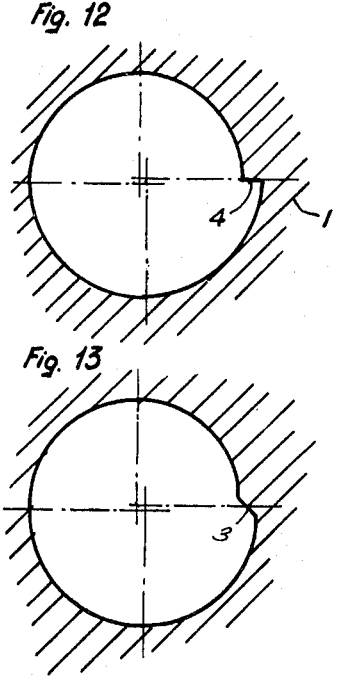
Fig. 11
Fig. 10
Fig. 12
Fig. 11a
Fig. 13
INVENTOR.
Giovanni Mantovanello

United States Patent Office 3,258,416
Patented June 28, 1966

3,258,416
CONNECTOR DEVICE, PARTICULARLY FOR FASTENING CURRENT CONDUCTORS TO CARBON ELECTRODES
Giovanni Mantovanello, Bolzano, Italy, assignor to Montecatini, Società Generale per l'Industria Mineraria e Chimica, Milan, Italy, a corporation of Italy
Filed June 26, 1961, Ser. No. 119,576
Claims priority, application Italy, June 27, 1960, 11,390/60
5 Claims. (Cl. 204—280)

My invention relates to a pin-and-socket type connector device, particularly for fastening current conductors to carbon electrodes, and will hereinafter be described mainly with reference to the carbon electrodes of electrolytic cells for the production of aluminum, to which the invention is preferably, through not exclusively, applicable.

It is an object of my invention to devise a releasable nipple joint between a stud or pin, such as a current-conducting plug, and a socket cavity, such as that of a carbon electrode, that combines a simple and easily producible design with particular ease of assembling and disassembling the components of the joint while also securing a reliable mechanical and electrical contact engagement.

To this end, and for attaining the further objectives described below, a junction device according to the invention comprises, as one of its features, a nipple on the conductor and a mating socket in the electrode that both have a cross section constituted by a figure inscribed within a segment of an Archimedean spiral. This will be more fully set forth hereinafter with reference to the accompanying drawings in which:

FIG. 1 is a front view of a carbon-anode assembly for an electrolytic furnace cell as used in aluminum production, the assembly incorporating features of my invention;

FIG. 2 is a sectional side view of the same assembly;

FIG. 3 is a top view of only the carbon blocks proper of the same assembly;

FIG. 4 is a cross section through one of the junction means that form part of the anode assembly and serve to fasten the current supply conductors to the carbon bodies; and FIG. 5 shows a detail of FIG. 1 on larger scale;

FIG. 10 is a sectional view of carbon bodies joined with each other to form part of an anode according to the preceding illustrations;

FIG. 11 shows in section a carbon-anode block with a socket to form part of fastening means according to the invention; FIG. 11a is a top view of the same block with a stud inserted into the socket and FIGS. 12 and 13 are cross sections along the line A—A in FIG. 11 of respectively different socket shapes.

Figure 6:
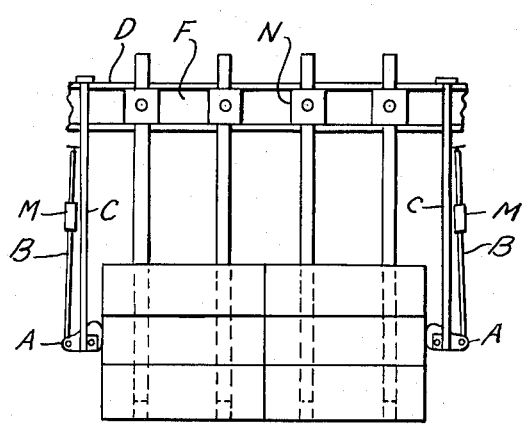
FIGS. 6 and 7 show respectively a front view and a sectional side view of another carbon-anode assembly with current conductors fastened in accordance with the invention.

In the electrolytic reduction of aluminum from alumina dissolved in molten cryolite, the current conducting bars have been joined with the carbon-anodes by means of a steel stud placed into a cavity in the anode and fastened therein by casting molten iron around the stud within the cavity, the conducting bar being bolted to the fastened stud. After the electrode, during operation, is consumed, the nipple of cast-iron is recovered and melted for further use.

This method, although satisfactory economically, often results in an electrically poor contact between conductor stud and carbon-anode, thus incurring excessive joint resistance losses. This is because the cast-iron nipple shrinks during solidification and then leaves an irregular gap between carbon and nipple metal with a corresponding high and irregular voltage drop at the contact location. In some aluminum producing mills, therefore, the cast-iron nipples have been substituted by threaded nipples. These are economically less profitable than the use of cast-iron nipples but they remarkably lower the joint-resistance losses.

More recently, however, the use of threaded nipple joints for aluminum production anodes has been virtually abandoned, and the industry now again prefers electrode joints with cast-iron nipples but in a modified and improved design. These cast-iron nipples are given best suitable sizes for both the stud and the thickness of the cast-iron layer between carbon and stud. Moreover, for securing a better contact between nipple and carbon, the socket cavity of the electrode is provided with a screw thread of a wide pitch, such as three turns of thread on a length of 80 mm. corresponding to a pitch of 26.7 mm., in lieu of the smooth-walled cavities previously employed. After the iron nipple is cast and cooled, the nipple is rotated a certain angle until the nipple front abuts against the bottom of the anode socket. In this manner, an appreciably improved average value of voltage drop between the nipple iron and the electrode carbon is attained.

The latter fastening method requires an accurate observation of nipple sizes and of the iron thickness between steel stud and carbon, and it also involves more difficulties and cost arising from the necessity of pressing and molding threaded socket cavities into the carbon-anodes.

It is therefore a more specific object of my invention to avoid the just-mentioned limitations and difficulties of forming a good cast-iron nipple joint while securing a more uniformly distributed mechanical pressure of the iron nipple on the carbon as well as to further reduce the voltage drop at the contact between iron nipple and carbon.

As mentioned, these improvements are achieved according to the invention by shaping the cross section of the electrode socket and also the cross section of the cast-iron nipple as a segment of an Archimedean spiral, as will be more fully explained presently.

The equation of an Archimedean spiral in polar coordinates can be written as:

$$r = a \cdot \theta / 2\pi$$

wherein $r$ is the radius vector, $a$ is a constant, $\theta$ is the anomaly. The equation represents the locus of a point moving at constant velocity on a straight radial line rotating at constant angular velocity. The constant value $a$ represents the ratio between the two velocities, and is tantamount to the radial displacement undergone by a spiral turn over one full (360°) rotation. That is, in an Archimedean spiral of many turns, the radial distance between any chosen point of a turn and the next following or preceding turn is always equal to $a$. Suppose that a point of a turn is connected with the subsequent turn by a radial line whose length will be equal to $a$, and consider the resulting geometric figure enclosed between the radial segment and the spiral portion circumscribed by the extremes of the figure. Then the resulting circumscribed area has the appearance of a cam as shown at H in FIG. 4, with an instantaneous return tooth or radial cam face at H'. The configuration according to FIG. 4 is obtained (in proportional size) with $a=15$ mm., and $\theta$ comprised between $5\pi+0.6$ and $7\pi+0.6$ radians.

If, in the same spiral, another portion is taken into configuration will be obtained which, however, includes a started from a more advanced point of the spiral, for example of 1 or 2 radians in order of magnitude, a similar consideration which is obtained analogously but which is larger area. In FIG. 4 such a second cam configuration is obtained by having the value $\theta$ comprised between $5\pi+1.9$ and $7\pi+1.9$ radians. When the two configurations thus obtained overlap, an interesting behavior is observed: The two configurations may be allowed to coincide over a major portion of their respective areas (in the exemplified case the turns coincide for a development corresponding to $2\pi+1.3$ radians); but when the first configuration is rotated relative to the second, a distinct severing of the development of the two outer turns is observed over their entire perimetric extent.

Now, according to my invention, the above-explained principle is applied by giving the nipple a cross section corresponding to the smaller segmented area (H in FIG. 4) and giving the electrode cavity a cross section corresponding to the larger segmented area (I in FIG. 4) of the same Archimedean spiral, so that a tight fastening of the nipple junction over substantially the entire perimetric surfaces is obtainable by simple rotation (of 1.3 radians in the exemplified case) of the nipple about its axis, thus fastening or disengaging the nipple from the cavity.

In this manner a reliable key-type junction can be effected with the advantages that the locking and disengaging can be performed with great rapidity and that the surfaces that enter into mutual locking engagement by the forcing action cover the maximum attainable areas.

In order to obtain a uniformity of mechanical pressure between the cast-iron nipple and the electrode carbon and thus to further decrease the joint resistance losses, it is preferable according to another feature of the invention, to give the socket cavity a slightly conical shape, tapering in the direction away from the socket bottom.

The carbon anode illustrated in FIGS. 11, 11a, 12 and 13 is designed in this manner. The carbon body 1 of the anode is provided at its top with a socket cavity 2 which tapers upwardly, having its smallest diameter $\phi$ at the top and whose cross section has a configuration inscribed within a segment of an Archimedean spiral as described above. This cross section may form a relatively sharp edge or tooth, as shown at 4 in FIG. 12, or the tooth portion may be somewhat at a slant, as shown at 3 in FIGS. 11a and 13.

In order to fasten the steel stud of a current-conductor bar to the electrode, the end of the stud 5 (FIG. 11a) is first inserted into the cavity 2 so as to be located centrally according to FIG. 11a. Thereafter the space between the stud 5 and the wall of the cavity is filled with cast iron. The stud 5 must be so placed into the cavity that the symmetry axis of the stud forms a certain angle $\alpha$ (FIG. 11a) with the symmetry axis 6 of the anode. This angle $\alpha$ depends upon the quality of the cast iron. When the iron nipple thus cast into the cavity is cooled, for example by introducing the conductor bar into one of the stud holes or by using a cooled pipe device, the iron nipple is rotated until by virtue of its spiral configuration, the gap between nipple and carbon resulting from shrinkage of the iron, is eliminated and the entire peripheral surface of the nipple is tightly forced against the anode carbon. The rotation angle to be used for thus tightening the nipple should be equal to $\alpha$, namely, such that the symmetry axis of the stud coincides with the symmetry axis of the anode. Preferably a rotation angle $\alpha$ of about 4° is used if the cast iron employed exhibits a linear contraction coefficient of 0.010 during solidification. This angle of rotation will vary a little when employing cast irons of different qualities. The described nipple joint also secures a good contact of the nipple bottom with the cavity bottom due to the fact that the electrode cavity is a truncated cone with the larger base at the bottom. Consequently when the cast-iron nipple is being rotated, a vertical downward component will result with the effect that the nipple bottom is pressed against the cavity bottom and thereby increases the contact surface.

The nipple sizes and the thickness of the cast-iron layer between the stud and the carbon are not limited by, or predicated upon, any accurate calculation because if the nipple size and the iron thickness will be more or less large, the rotation angle of the nipple will simply become larger or smaller. In comparison with threaded nipple joints, fewer difficulties are encountered when forming the anode with a cavity of spiral cross section and upwardly tapering shape.

When the electrode, during its use, is sufficiently consumed, the cast iron is recovered and can be melted to form new nipples in the same manner as in the above-described conventional method. A nipple junction according to the invention eliminates all above-mentioned deficiencies and difficulties encountered with the known fastening systems. Technologically the results are at least as favorable as those obtained with threaded nipples, and in economical respects the joints according to the invention are just as satisfactory as obtained with the known cast-iron nipples.

A modified spiral-type junction for mechanically and electrically joining a current conductor with a carbon-anode is obtained by eliminating the above-mentioned cast-iron nipple between the conductor stud and the carbon body. In such a modified device, the end or stud portion of the current conductor itself is given a cross section according to an Archimedean spiral as shown in FIG. 4. By placing the cam tooth H' of the conductor H into loose contact with the corresponding tooth I' of the carbon-anode, the conductor can readily be slipped into the bore or cavity of the anode. Thereafter a slight rotation of the conductor about its axis relative to the carbon block will forcefully and uniformly press the conductor against the peripheral wall of the anode cavity substantially over the entire wall surface thus securing a contact compression which, for any given angle of rotation, increases with the size of the spiral pitch (radial height of the tooth H' or I').

The application of a joint according to the invention to the carbon-anodes of electric cells for reduction of aluminum is exemplified by the embodiments described presently.

The anode of an electrolytic cell may be composed of prefabricated carbon blocks each provided with a row of parallel bores that are given the cross section of an Archimedean spiral as described above. Such a composite anode is shown in FIGS. 1, 2 and 3. In the illustrated assembly the anode is made up of several horizontal layers of block elements, each layer comprising four individual elements such as those denoted by I, II, III, IV. Each element has two parallel holes of spiral cross section such as the one denoted by H in FIG. 3. These holes traverse the entire block element in a vertical direction relative to the operative position of the anode according to FIGS. 1 and 2. The block elements are joined together by junction structures according to the invention, and the entire block assembly is supported by means of clamping shoes A (FIGS. 1, 5) which are forced against the block assembly by means of tie members B and are suspended from a traverse beam D. The carbon blocks I, II, III, IV receive electric current through elongated nipple rods H whose cross section also forms an Archimedean spiral mating the spiral cross section of the block cavities in the manner explained above. Terminals G are fastened to the top of the nipple rods H by lateral screws bolts L. Accordingly, the electric current reaches the anode assembly from the cross bar F through flexible cable members E, the terminals G and the nipple rods H. The spiral nipple rods H thus secure a good mechanical connection among the individual block elements of the anode assembly as well as an electric connection between the nipple rods and the block elements, and also provide the electric connection between the anode assembly and the current supply buses. This good mechanical and electrical connection is due to the fact that the nipple rods, once forced into contact engagement with the electrode cavities, contact the cavity walls virtually along their entire peripheral and axial extent, thus distributing the mechanical forces as well as the electric contact over substantially the maximum area available. The electric connection between the individual block elements can be improved by placing a conductor paste between the nipple rods and the cavity walls, this paste acting exclusively as a conductive means because no adhesive action or braking action is required.

When the lowermost layer of carbon elements is consumed, another layer of elements can readily be added on top of the entire pile. For this purpose, the terminals G are disengaged by unscrewing the bolts L, and the nipple rods H are pulled out of the pile of block elements. Thereafter a new layer of block elements is placed on top of the pile, the nipple rods are reinserted and turned, and the terminals G are thereafter joined with the top ends of the nipple rods.

Figure 7:
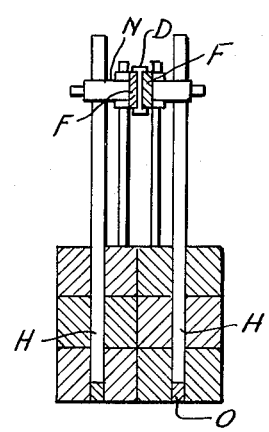

A modified design of conductor-electrode joints for an electrolytic cell is shown in FIGS. 6 and 7. In this embodiment the current-conducting nipple rods also form part of the mechanical mounting or suspension of the anode assembly. The nipple rods denoted by H in FIGS. 6 and 7, extend upwardly beyond the supporting cross beam F and are fastened thereto by means of clamps N.

Figure 8:
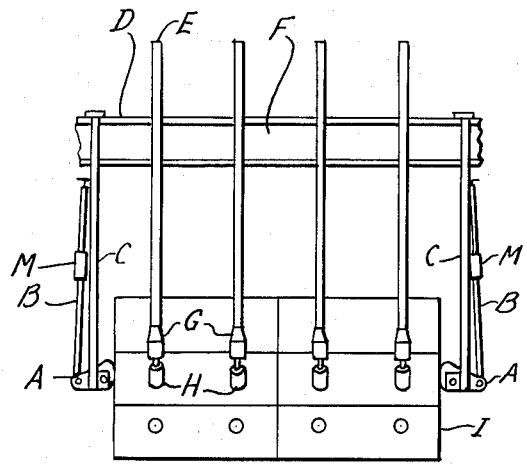
FIGS. 8 and 9 are a front view and sectional side view respectively of still another anode assembly with modified conductor-fastening means according to the invention.
Figure 9:
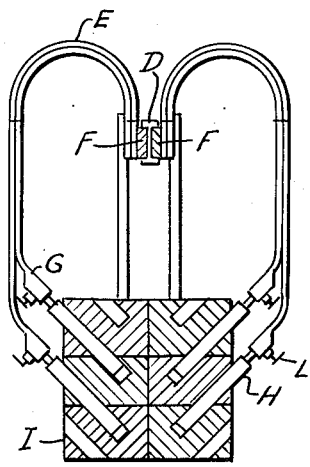

In the modification shown in FIGS. 8 and 9, the current conductors or nipple rods H are inserted into the anodic mass from the lateral sides thereof and extend at an angle to the vertical. In all other respects the embodiment corresponds to the one described above with reference to FIGS. 1, 2 and 3.

If in a particular case a higher degree of adhesion among the carbon blocks is desired, a double dovetail joint according to FIG. 10 may be used. The dovetailing is effected by means of intermediate wedge bodies P of carbon which are forced horizontally into corresponding undercut grooves of the carbon blocks. In all other respects, these blocks I, I may correspond to those described above with reference to FIGS. 6 to 13.

It will be obvious that the invention is applicable in the same manner as described above, to carbon electrodes for melting furnaces, as well as to bodies of carbon or other material employed for other purposes. The invention is further applicable generally for obtaining a mechanical or mechanical-electrical connection between a bolt or rod and another body or housing, namely, wherever it is desirable to provide for fastening and locking by means of a slight amount of turning motion and to thereby secure a strong mechanical forcing effect substantially over the entire peripheral areas of the mutually engaging male and female portions of the joint. As mentioned, by giving the cavity portion of the joint a slightly conical design according to FIG. 11, the bolt member of the joint can also be forced tightly against the bottom of the cavity, thus further increasing the mutual engagement and improving the connection mechanically and, if desired, also electrically.

I claim:

1. An electrode assembly comprising a carbon electrode having a socket cavity, a connector device for joining a current conductor with said electrode, said connector device including a metal nipple member engaging said cavity, said nipple member and said socket cavity both having a cross section constituted by the area within a segment of the same Archimedean spiral, each of said segmental areas being circumscribed by substantially one full spiral turn remote from the innermost turn of the spiral and by a line transverse to and joining the respective ends of said one turn, the respective spiral contact surfaces of said member and cavity being engageable with each other over substantially the entire permetric extent of said surfaces by rotation of said member about its axis relative to said electrode, said nipple member and said socket cavity defining together an intervening space along said spiral for permitting relative rotation of said nipple member within said cavity.

2. In an electrode assembly according to claim 1, said socket cavity and said nipple member having a shape tapering inwardly from the bottom toward the opening of said cavity, whereby the bottom surface of the cavity is also engaged by said member in fully engaged condition of the latter.

3. An electrode assembly comprising a carbon electrode with a socket cavity having a cross section constituted by the area within a segment of an Archimedean spiral, each of said segmental areas being circumscribed by substantially one full spiral turn remote from the innermost turn of the spiral and by a line transverse to and joining the respective ends of said one turn, a current conductor, a metal stud to form part of said current conductor, said stud being located in said cavity and having a non-circular cross section smaller than that of said socket cavity, and a cast-iron nipple filling the space between said stud and said cavity, said stud and nipple being jointly rotatable for fastening and loosening the junction, said nipple member and said socket cavity defining together an intervening space along said spiral for permitting relative rotation of said nipple member within said cavity, the corresponding radii of said nipple member and said cavity being substantially the same.

4. An electrode assembly comprising a carbon electrode having a socket cavity and an elongated current conductor rod having an end in said cavity, said rod end and said socket cavity having both a cross section constituted by the area within a segment of an Archimedean spiral, each of said segmental areas being circumscribed by substantially one full spiral turn remote from the innermost turn of the spiral and by a line transverse to and joining the respective ends of said one turn, the respective spiral contact surfaces of said rod end and cavity being in area contact with each other over substantially the entire perimetric extent thereof when said rod is in connecting engagement with said cavity, and said respective spiral surfaces being disengageable from each other by rotation of said rod relative to said anode, said nipple member and said socket cavity defining together an intervening space along said spiral for permitting relative rotation of said nipple member within said cavity.

5. In an electrode assembly having a current conductor to a plural-layer carbon-anode assembly, a connector device for joining said conductor to said anode assembly comprising aligned vertical socket bores traversing the anodes in respective layers of the anode assembly, conductor rods extending through said respective alignments of bores, said rods and said bores having respective cross sections of different size constituted by the area within a segment of an Archimedean spiral, each of said segmental areas being circumscribed by substantially one full spiral turn remote from the innermost turn of the spiral and by a line transverse to and joining the respective ends of said one turn, each of said rods being rotatable a given angle within the aligned bores engaged thereby and having its spiral perimetric surface in pressure contact with substantially the entire surface of said bores when said rod is in one angular position of rotation, and said rod surface being released from said bore surfaces to permit withdrawal of the rod when the rod is in another angular position, whereby, upon withdrawal of the rods, new carbon anodes can be added on top of the uppermost layer.

References Cited by the Examiner

UNITED STATES PATENTS

| | | | |
|---|---|---|---|
| 377,988 | 2/1888 | Bowers | 287—136 |
| 2,234,486 | 3/1941 | Craig. | |
| 2,769,113 | 10/1956 | Graybeal | 204—286 |
| 2,937,980 | 5/1960 | Schmitt et al. | 204—294 |
| 3,020,220 | 2/1962 | Helling et al. | 204—294 |

FOREIGN PATENTS 18,222   12/1915   Great Britain.

JOHN H. MACK, *Primary Examiner.*

D. R. JORDAN, *Assistant Examiner.*